United States Patent Office 2,836,732
Patented May 27, 1958

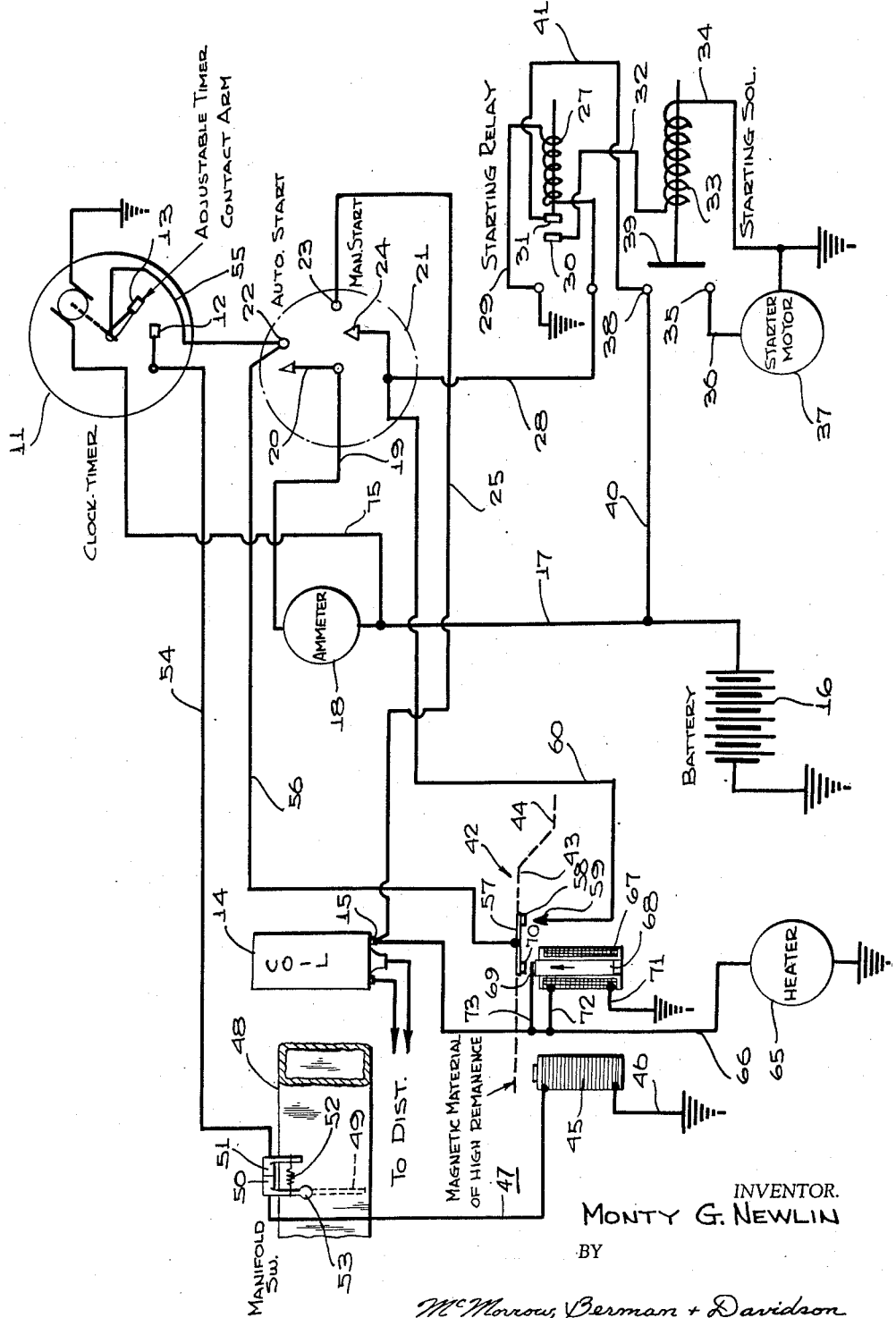

2,836,732

AUTOMATIC CAR STARTER

Monty G. Newlin, Paoli, Ind.

Application March 22, 1957, Serial No. 647,897

4 Claims. (Cl. 290—38)

This invention relates to starting devices for automobiles, and more particularly to an automatic timed starting and pre-warming device for a motor vehicle.

A main object of the invention is to provide a novel and improved device for automatically starting a motor vehicle at a predetermined time and energizing the motor vehicle heater at said predetermined time, whereby the automobile engine and the interior of the automobile will have had sufficient time to warm up when the operator enters the vehicle.

A further object of the invention is to provide an improved automatic timed starting and pre-warming system for a motor vehicle, said system involving relatively simple components, being easy to adjust for operation at a desired time, and being easy to install in a motor vehicle.

A still further object of the invention is to provide an improved automatic device for energizing the starting motor, ignition circuit and heater of a motor vehicle at a predetermined time, for deenergizing the starting motor after the engine is in operation, and for maintaining the ignition circuit and heater energized after the starting motor has been deenergized, whereby the engine and the interior of the motor vehicle will be sufficiently warmed up when the operator enters the vehicle.

Further objects and advantages of the invention will become apparent from the following description and claims, and from the accompanying drawings, wherein:

The single figure is a schematic wiring diagram illustrating electrical connections of the automatic timed starting and pre-warming device of the present invention.

Referring to the drawings, 11 designates an electrically operated time switch, for example, a conventional automobile clock provided with a pair of timed contacts, for example, a stationary contact 12 and an adjustable contact arm 13 which may be preset to engage with the stationary contact 12 at a predetermined time. The device 11 may thus be employed as an automobile clock and may be mounted on the vehicle dashboard. Said device 11 is entirely conventional in construction and in itself forms no part of the present invention.

Designated at 14 is the ignition coil of the motor vehicle in which the automatic time starting and prewarming system of the present invention is installed, the coil 14 having the input voltage supply terminal 15 adapted to be energized from the ungrounded terminal of the motor vehicle battery 16. Thus, the ungrounded terminal of battery 16 is connected by a wire 17 through an ammeter 18 to a wire 19, which is in turn connected to the rotary pole 20 of a manually operated control switch 21 mounted on the dashboard of the motor vehicle. Switch 21 has a first stationary contact 22 engageable by the pole 20 in the "automatic start" position of said pole. Switch 21 has a secondary stationary contact 23 which is engageable by the manually rotatable pole 20 in the "manual start" position of said pole. When the pole 20 is placed in the "manual start" position, the pole 20 momentarily engages an additional stationary contact element 24 provided on the switch 21.

The supply terminal 15 of the coil 14 is connected by a wire 25 to the switch contact 23, whereby the coil 14 is energized from the battery 16 when the pole 20 engages the contact 23 by a circuit comprising the ungrounded terminal of battery 16, wire 17, ammeter 18, wire 19, pole 20, contact 23, and wire 25, the coil 14 being connected to the grounded terminal of the battery 16 by the usual ground connection thereof.

When the pole 20 engages the contact 24, the motor vehicle starting relay, shown at 27, becomes energized by a circuit comprising the ungrounded terminal of the battery 16, wire 17, ammeter 18, wire 19, pole 20, contact 24, a wire 28 connected to one terminal of the starting relay winding, and a wire 29 connecting the opposite terminal of the starting relay winding 27 to ground. The starting relay is provided with a stationary contact 30 and a movable contact 31 which engages the stationary contact 30 when the starting relay winding is energized. Contact 30 is connected by a wire 32 to one terminal of a starting solenoid 33. The remaining terminal of the starting solenoid 33 is connected to ground by a wire 34. Associated with the starting solenoid 33 is the usual movable armature 39 adapted to bridge a pair of contacts 35 and 38 responsive to the energization of the solenoid winding. Contact 35 is connected by a wire 36 to the ungrounded terminal of a starter motor 37. Contact 38 is connected by a wire 40 to the ungrounded battery terminal wire 17.

The movable contact 31 of the starting relay is connected by a wire 41 to the solenoid contact 38, so that when the starting relay 27 is energized, the solenoid 33 becomes energized by a circuit comprising the ungrounded terminal of battery 16, wire 17, wire 40, contact 38, wire 41, contact 31, contact 30, wire 32, the winding of the solenoid 33, and the ground wire 34. The armature 39 then bridges the terminals 35 and 38, energizing the starting motor 37 by a circuit comprising the ungrounded terminal of battery 16, wire 17, wire 40, contact 38, armature 39, contact 35, wire 36, the starting motor winding, and the ground connection thereof.

Designated generally at 42 is a control relay device which comprises a movable armature 43 of magnetic material having a high degree of remanence, the armature 43 being secured at one end in any suitable manner to a stationary portion of the vehicle, for example, at a downwardly offset portion 44 thereof. Designated at 45 is a main relay winding associated with the armature 43, one terminal of the relay winding being grounded, as by a wire 46, and the other terminal thereof being connected to a wire 47. Pivotally mounted in the exhaust rectangular shaped manifold 48 of the motor vehicle is a rectangular shaped flap member 49 carrying a switch contact 50. Contact 50 is normally biased into engagement with a stationary contact 51 secured to the manifold 48 and connected by a coiled spring 52 to the movable contact arm which carries switch contact 50. As shown, the contact arm which carries switch contact 50 is connected to an external portion of the shaft 53 of the flap member 49 so that the contact arm which carries switch contact 50 is external to the exhaust manifold 48, the stationary contact 51 being likewise secured externally to said exhaust manifold so as to be engaged by the contact arm which carries switch contact 50 by the biasing force of the spring 52. The flap member 49 is positioned within the manifold 48 in the path of exhaust gases flowing through the manifold when the motor vehicle engine is in operation, whereby the flow of exhaust gas causes the flap member 49 to swing in a counterclockwise direction, as viewed in the drawing, to thereby separate the contacts 50 and 51.

The wire 47 is connected to the movable fluid flow-responsive contact element 50. The stationary contact element 51 is connected by a wire 54 to the stationary contact 12 of the clock switch 11. The adjustable contact arm 13 of the clock switch 11 is connected by a wire 55 to the stationary contact 22 of the manually operated switch 21.

Contact 22 is connected by a wire 56 to a bridging conductor 57 secured to the armature 43, said conductor 57 having a first contact element 58 engageable with a stationary contact 59 responsive to the energization of the main relay member 45. Contact 59 is connected by a wire 60 to the wire 28, and hence to one terminal of the starting relay winding 27. When the switch arm 20 engages the contact 22 and contacts 58, 59 close, relay 27 becomes energized by a circuit comprising the ungrounded terminal of battery 16, wire 17, ammeter 18, wire 19, switch arm 20, contact 22, wire 56, conductor 57, contact 58, contact 59, wire 60, wire 28, the winding of the starting relay 27 and the ground wire 29.

As will be readily apparent, the main relay winding 45 becomes energized when the clock switch contacts 13 and 12 close, by a circuit comprising the ungrounded terminal of battery 16, wire 17, ammeter 18, wire 19, switch pole 20, contact 22, wire 55, the movable timer contact arm 13, stationary contact 12, wire 54, contacts 51 and 50, wire 47, the winding 45 of the main relay, and the ground wire 46. This energizes the starting relay 27 and hence energizes starting motor 37 by the action of the solenoid 33. When the flap member 49 is rotated counterclockwise, as viewed in the drawing, by the flow of exhaust gas through the manifold 48, the winding 45 of the main relay becomes deenergized by the opening of the contacts 50 and 51, whereby contact element 58 disengages from stationary contact 59, deenergizing the starting relay 27, and terminating operation of the starting motor 37.

The low voltage winding of coil 14 is connected in parallel with the motor vehicle heater 65, the ungrounded terminals of the heater 65 and the low voltage winding of coil 14 being connected to a common wire 66, said wire extending from the terminal 15 of coil 14 to the ungrounded terminal of the heater 65. Designated at 67 is an auxiliary relay device mounted adjacent to the armature 43 and having a slidable plunger 68 of magnetic material movable towards the armature 43 responsive to the energization of the winding of the auxiliary relay device 67. The plunger 68 has a contact element 69 secured thereto which is engageable with a contact element 70 carried by the conductive member 57. The plunger element 68 is of course of magnetic material, and since the armature 43 has a substantial degree of remanence, the plunger 68 tends to remain attracted to the armature 43 after having once been moved adjacent to the armature. The winding of the relay device 67 has one grounded terminal, connected to ground by the wire 71, and has its ungrounded terminal connected by a wire 72 to the wire 66, whereby the winding of the auxiliary relay device 67 is connected in parallel with the heater 65 and the low voltage winding of the ignition coil 14. The contact element 69 is connected by a wire 73 to the wire 66.

As above explained, energization of the main relay winding 45 moves the armature 43 so that contact 58 engages the stationary contact 59. This movement also causes the contact element 70 to engage the plunger-carried contact 69, thus energizing the parallel-connected heater 65, low voltage winding of the ignition coil 14, and the winding of the auxiliary relay 67 by a common energizing circuit comprising the wire 66, the wire 73, the contacts 69 and 70, the conductor 57, the wire 56, contact 22, pole 20 (in engagement with contact 22), wire 19, ammeter 18, wire 17, and the ungrounded terminal of the battery 16.

After the vehicle engine has started, the exhaust gas in the manifold 48 opens the contacts 50 and 51, as above described, deenergizing the main relay winding 45, causing the armature 43 to be elevated by its normal biasing means, which may be, for example, a biasing spring, or the resiliency of the armature 43, opening the contacts 58 and 59, and thereby deenergizing the starting relay 27. This terminates the operation of the starting motor 37. However, the plunger 68 remains attracted to the armature 43, maintaining the contacts 69 and 70 closed, thus maintaining the energization of the winding 67 of the auxiliary relay device and maintaining the ignition coil 14 and the heater 65 energized. The magnetic force of the auxiliary relay device 67 coupled with the residual magnetism in the armature 43 is sufficient to sustain the weight of the slidable plunger 68 and to thus maintain the contacts 69 and 70 closed. The plunger 68 will thus be held in elevated position until the winding of the auxiliary relay device 67 is deenergized, which occurs when the manually operated switch pole 20 is disengaged from the contact 22. With the winding of the auxiliary relay device 67 deenergized, the force of gravity is sufficient to cause the plunger 68 to drop away from the armature 43, opening the contacts 69 and 70, and deenergizing the heater 65 and the ignition coil 14.

From the above description it will be apparent that the adjustable timer contact arm 13 may be set to close at a predetermined time, for example, approximately one-half hour or more before the operator desires to use the vehicle. The pole 20 is placed in the "automatic start" position, whereby the engagement of the timer contact arm 13 with the stationary contact 12 energizes the main relay winding 45 at said predetermined time, causing the starting motor 37 to be energized, and simultaneously connecting the ignition coil 14, the heater 65 and the winding of the auxiliary relay device 67 in parallel to the ungrounded terminal of the battery 16 by the circuit above described. When the engine starts, the switch contacts 50 and 51 disengage because of the fluid pressure exerted by the exhaust gases in the manifold 48, thus deenergizing the starting motor 37, but the ignition coil 14 and the heater 65, as well as the winding of the auxiliary relay device 67, are maintained energized by the clinging of the plunger 68 to the armature 43 and consequently by the engagement of the contacts 69 and 70. Therefore the motor vehicle continues to operate after the starter motor 37 becomes deenergized, allowing the engine to fully warm up and the interior of the vehicle to become preheated, so that the vehicle is completely prepared for use at the time the operator enters same.

The movable contact arm 13 preferably has a dwell period on the stationary contact 12 of a substantial period of time, of the order of thirty seconds, to allow ample time for the starting motor 37 to start the vehicle engine, but to prevent excessive operation thereof in the event that the engine fails to start.

The clock device 11 is energized in the usual manner from the vehicle battery 16, as by a wire 75 connecting its ungrounded terminal to the ungrounded battery terminal wire 17.

While a specific embodiment of an improved automatic timed starting and prewarming device for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automatic timed starting and prewarming system for a motor vehicle having an internal combustion engine, a starting motor, an exhaust conduit, an ignition circuit, and a heater, a source of current, an adjustable clock switch, a normally closed, fluid flow-responsive switch in said exhaust conduit, first relay means connected to said source through said clock switch and normally closed fluid flow-responsive switch and being formed and arranged to connect said starting motor, ignition circuit and heater to said source responsive to closure of said clock switch, second relay means formed and arranged to be energized responsive to energization of said first relay means, and normally open contact means controlled jointly by said first and second relay means and arranged to maintain said ignition circuit and heater energized after said first relay means becomes deenergized responsive to flow of exhaust gas from said exhaust conduit.

2. In an automatic timed starting and prewarming system for a motor vehicle having an internal combustion engine, a starting motor, an exhaust conduit, an ignition circuit, and a heater, a source of current, an adjustable clock switch, a normally closed, fluid flow-responsive switch in said exhaust conduit, first relay means connected to said source through said clock switch and normally closed fluid flow-responsive switch and being formed and arranged to connect said starting motor, ignition circuit and heater to said source responsive to closure of said clock switch, second relay means connected in parallel with said ignition circuit and heater and being formed and arranged to be energized responsive to energization of said first relay means, said first relay means including an armature element of magnetic material having substantial remanence, a movable magnetic element operatively associated with said second relay means and being magnetically attracted to said armature element responsive to energization of said first and second relay means, switch means closed responsive to the movement of the magnetic element towards said armature element, means deenergizing the starting motor when the first relay means becomes deenergized responsive to the opening of the flow-responsive switch, and circuit means connecting the ignition circuit, heater and second relay means to said source through said last-named switch means, whereby to maintain said ignition circuit and heater energized after said first relay means becomes deenergized responsive to flow of exhaust gas through said exhaust conduit.

3. In a clock-controlled automatic starting and prewarming device for a motor vehicle, a control relay comprising a main operating winding connected to a source of current in circuit with a clock switch and a normally closed exhaust switch, whereby the main winding may be energized when the clock switch closes and becomes deenergized when the exhaust switch opens, said control relay including an armature and contacts controlling a starting motor of the vehicle, said armature having a magnetic portion having substantial remanence, an auxiliary winding provided with a movable magnetic member arranged adjacent to and movable toward said magnetic portion responsive to deenergization of said auxiliary winding, means to energize said auxiliary winding simultaneously with said main winding, and a pair of switch contacts closed responsive to the movement of said magnetic member toward said magnetic portion and held closed by the magnetic attraction therebetween, said switch contacts being connected in circuit between said source and a parallel circuit comprising the auxiliary winding, an ignition circuit of the vehicle and a heater circuit of the vehicle.

4. In a clock-controlled automatic starting and prewarming device for a motor vehicle, a control relay comprising a main operating winding connected to a source of current in circuit with a clock switch and a normally closed exhaust switch, whereby the main winding may be energized when the clock switch closes and becomes deenergized when the exhaust switch opens, said control relay including an armature and contacts controlling a starting motor of the vehicle, said armature comprising a movable arm of magnetic material having substantial remanence, an auxiliary winding provided with a movable magnetic plunger arranged adjacent to and movable toward said magnetic arm responsive to energization of said auxiliary winding, means to energize said auxiliary winding simultaneously with said main winding, and respective opposing switch contacts on said plunger and magnetic arm closed responsive to the movement of said magnetic plunger toward said magnetic arm and held closed by the magnetic attraction therebetween, said last-named switch contacts being connected in circuit between said source and a parallel circuit comprising the auxiliary winding, an ignition circuit of the vehicle and a heater circuit of the vehicle.

References Cited in the file of this patent

UNITED STATES PATENTS

| | | |
|---|---|---|
| 1,269,637 | Olmsted | June 18, 1918 |
| 2,606,298 | Merritt | Aug. 5, 1952 |
| 2,607,013 | Drummond | Aug. 12, 1952 |
| 2,748,759 | Schiffer | June 5, 1956 |